United States Patent
Kim et al.

(10) Patent No.: US 8,407,270 B2
(45) Date of Patent: Mar. 26, 2013

(54) METHODS OF CALCULATING NEGATIVE INVERSE OF MODULUS

(75) Inventors: Young-sik Kim, Gyeonggi-do (KR); Mi-jung Noh, Gyeonggi-do (KR); Kyoung-moon Ahn, Seoul (KR); Sun-soo Shin, Seoul (KR)

(73) Assignee: Samsung Electronics Co., Ltd. (KR)

( * ) Notice: Subject to any disclaimer, the term of this patent is extended or adjusted under 35 U.S.C. 154(b) by 722 days.

(21) Appl. No.: 12/618,283

(22) Filed: Nov. 13, 2009

(65) Prior Publication Data

US 2010/0138467 A1    Jun. 3, 2010

(30) Foreign Application Priority Data

Dec. 2, 2008    (KR) .................. 10-2008-0121272

(51) Int. Cl.
*G06F 7/38* (2006.01)

(52) U.S. Cl. ................... 708/491; 708/490; 380/28

(58) Field of Classification Search ................... None
See application file for complete search history.

(56) References Cited

U.S. PATENT DOCUMENTS 7,027,598 B1 * 4/2006 Stojancic et al. ............... 380/28

FOREIGN PATENT DOCUMENTS

| JP | 2004-226516 | 8/2004 |
|---|---|---|
| JP | 2005-221830 | 8/2005 |
| KR | 1020050064645 A | 6/2005 |

* cited by examiner

*Primary Examiner* — Michael D Yaary
(74) *Attorney, Agent, or Firm* — Myers Bigel Sibley & Sajovec, P.A.

(57) ABSTRACT

Provided is a method of calculating a negative inverse of a modulus, wherein the negative inverse, which is an essential element in Montgomery multiplication, is quickly obtained. The method includes setting a modulus, defining P obtained by converting the modulus to a negative number, and defining S obtained by subtracting 1 from P, and calculating a negative inverse of the modulus by using P and S.

12 Claims, 3 Drawing Sheets

METHODS OF CALCULATING NEGATIVE INVERSE OF MODULUS

CROSS-REFERENCE TO RELATED APPLICATIONS

This application claims the benefit of Korean Patent Application No. 10-2008-0121272, filed on Dec. 2, 2008, in the Korean Intellectual Property Office, the disclosure of which is incorporated herein in its entirety by reference.

BACKGROUND

The present invention relates generally to encoding and, more particularly to encoding systems and methods.

A Rivest Shamir Adleman (RSA) algorithm is an Internet encoding and authentication system, where encoding and decoding are performed by using a public key and a private key, which are generated by using two big prime numbers. The RSA algorithm generates the public key and the private key by multiplying and adding the two big prime numbers. The public key and the private key may be used to encode and decode information transmitted via the Internet, such as an e-mail message. Operational principles of such encoding and decoding are described in detail, for example at the RSA website (www.rsa.com). Encoding and decoding times in a public key encoding system may increase as the length of a used key increases. In order to reduce the large amount of calculation and a corresponding long operation time of the RSA algorithm, an elliptic curve algorithm has recently come into the spotlight as a replacement for the RSA algorithm.

However, since public key encoding systems like the RSA algorithm and the elliptic curve algorithm, use a modular operation on very big numbers, performance of a security system largely depends on how fast and efficiently the modular operation is performed. Specifically in the recent RSA algorithm, a key of at least 2,048 bits is used for high security and a key of up to 4,096 bits may be required to be supported in the future. Under such circumstances, it is very important to perform the modular operation at high speed in various application fields.

There are several algorithms for performing modular multiplication, and a Montgomery modular multiplication technique is widely used in hardware. For the last 20 years, studies for realizing the Montgomery modular multiplication technique in hardware have been conducted, but in most cases, only radix 2, radix 4, or radix 8 were used. Although it is well known that increasing a radix is the best way for increasing an operation speed, a process of determining a quotient becomes complicated when a radix increases. Accordingly, it is difficult to increase a radix as much as desired.

SUMMARY

Embodiments of the present invention provide a method of calculating a negative inverse of a modulus, where the negative inverse, which is an essential element in Montgomery multiplication, of the modulus, is quickly calculated.

According to an embodiment of the present invention, a method of calculating a negative inverse of a modulus $M_0$ includes: setting a modulus $M_0$; defining P obtained by converting the modulus $M_0$ to a negative number, and defining S obtained by subtracting 1 from P; and calculating a negative inverse $V_0$ of the modulus $M_0$ by using P and S.

According to another embodiment of the present invention, a method of calculating a negative inverse of a modulus includes: classifying a main modulus into L modulus groups, wherein L is an integer of at least 1; and sequentially calculating negative inverses of L modulus groups from a modulus group including an LSB (least significant bit) of the main modulus through a modulus group including an MSB (most significant bit) of the main modulus.

BRIEF DESCRIPTION OF THE DRAWINGS

Exemplary embodiments of the present invention will be more clearly understood from the following detailed description taken in conjunction with the accompanying drawings in which.

DETAILED DESCRIPTION

Figure 1:
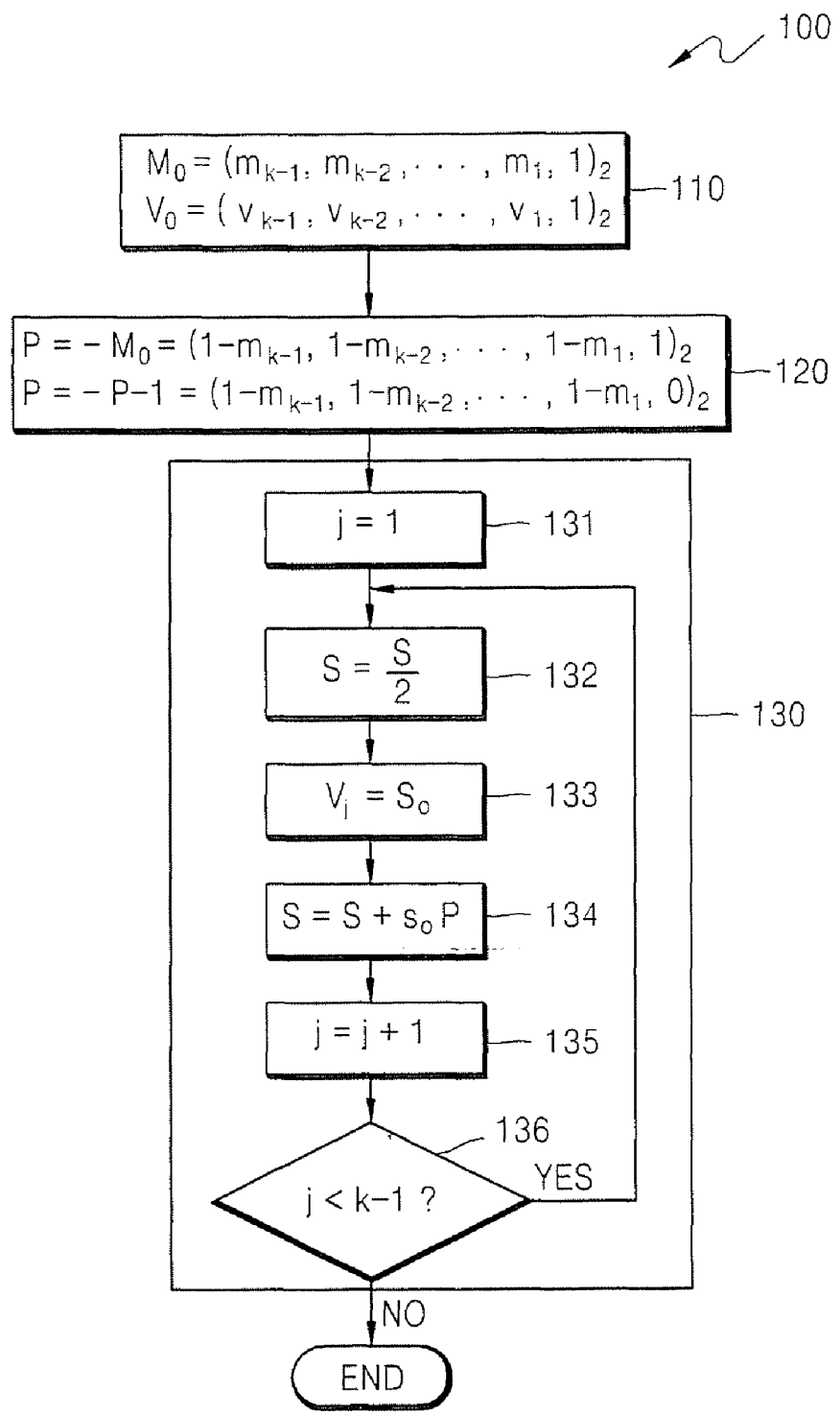
FIG. 1 is a flowchart illustrating a method of calculating a negative inverse of a modulus, according to an embodiment of the present invention.

The present invention is described more fully hereinafter with reference to the accompanying drawings, in which example embodiments of the invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. As used herein, the term "and/or" includes any and all combinations (mixtures) of one or more of the associated listed items and may be abbreviated as "/".

It will be understood that, although the terms first, second, third etc. may be used herein to describe various elements, these elements should not be limited by these terms. These terms are only used to distinguish one element from another element. Thus, a first element discussed below could be termed a second element without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present application, and will not be interpreted in an idealized or overly formal sense unless expressly so defined herein.

A concept of division of a binary number that is used in a method of calculating a negative inverse $$\left(-\frac{1}{M}\right)$$

of a modulus M according to embodiments of the present invention will be described first.

A binary A may be expressed as Equation 1 below.

$$A = a_3 2^3 + a_2 2^2 + a_1 2^1 + a_0 2^0 \quad (1)$$

Here, when a coefficient $a_0$ is 0, a value obtained by dividing the binary A by 2 may be expressed as Equation 2 below.

$$\frac{A}{2} = a_3 2^2 + a_2 2^1 + a_1 2^0 \quad (2)$$

As shown in Equation 2, when the binary A having the least significant bit of 0 is divided by 2, a number of bits (A/2) is reduced by 1. A result of Equation 2 is well known to one of ordinary skill in the art, and thus detailed operation processes need not be described further herein.

The method of calculating the negative inverse of the modulus M that will be described later uses the same operational result.

In detail, high radix Montgomery multiplication may be shown as follows. For convenience of hardware realization, a radix generally uses a square of 2.

Algorithm: High Radix Montgomery Multiplication

---

Inputs: $2^{r-1} < M < 2^r$ $-M < A, B < M$ where $B = \sum_{i=0}^{n-1} B_i 2^{ki}$ and $B_i \in \{0, 1, \ldots, 2^k - 1\}$ Output: $S_n = AB2^{-r} \mod M$
1. $S_0 = 0$
2. For i = 0 to n-1
   A. $Q_i = -1/M \times (S_{i-1} + B_i A) \mod 2^k$
   B. $S_i = (S_{i-1} + B_i A + Q_i M)/2^k$
3. If $S_n < 0$ then $S_n = S_n + M$

---

Here, like 2.A. above, a quotient ($Q_i$) must be calculated at each loop. At this time, an operation of multiplying a value of $$-\frac{1}{M},$$

which is the negative inverse of the modulus M, by ($S_{i-1} + B_i A$), which is a result of adding a previous result to a new partial multiplication, is required.

Conventionally, a method of pre-calculating all negative inverses related to a given radix, storing the pre-calculated negative inverses in a table, and using a required value of the pre-calculated negative inverses is used. However, when a radix increases, a size of a corresponding table also increases exponentially. For example, when inverses of an odd modulus are to be stored if a radix is $2^k$, a memory of $(k-1)2^{k-1}$ bits is required.

A quotient (q) in Montgomery multiplication is obtained as follows.

When $S_{i-1} + B_i A$, i.e. the previous result ($S_{i-1}$) and the new partial multiplication ($B_i A$), is referred to as spp, a quotient q, which makes k lower bits of spp equal to 0 as described above, is defined as Equation 3 below.

$$q = -\frac{1}{M} * spp \mod 2^k \quad (3)$$

In other words, the quotient q may be obtained by calculating $$-\frac{1}{M}$$

first, and then multiplying $$-\frac{1}{M}$$

by spp. Accordingly, a method of efficiently calculating $$-\frac{1}{M}$$

i.e. the negative inverse of the modulus M, is required.

Embodiments of the present invention provide an algorithm for efficiently calculating the negative inverse of the modulus M, wherein the negative inverse is essential in calculating a quotient related to high radix Montgomery multiplication having a radix $2^k$, wherein k is a predetermined integer larger than 0. An algorithm for calculating $$-\frac{1}{M}$$

mod $2^k$, which includes the negative inverse of the modulus M according to embodiments of the present invention, is as follows.

---

Input    $M = (m_{k-1}, m_{k-2}, \ldots, m_1, 1)_2$

Output  $V = -\frac{1}{M} \mod 2^k = (v_{k-1}, v_{k-2}, \ldots, v_1, 1)_2$

Set      $P = -M = (1 - m_{k-1}, 1 - m_{k-2}, \ldots, 1 - m_1, 1)_2$
          $S = P - 1 = -M - 1 = (1 - m_{k-1}, 1 - m_{k-2}, \ldots, 1 - m_1, 0)_2 = (s_{k-1}, s_{k-2}, \ldots, s_1, s_0)_2$ For     $i = 1$ to $k - 1$ $S = \frac{S}{2}$ $V_i = s_0$ (wherein $s_0$ is the least significant bit (LSB) of S)
          $S = S + s_0 P$ End for.

---

A method of calculating a negative inverse $$\left(-\frac{1}{M}\right)$$

of a modulus M according to embodiments of the present invention will now be described.

The method may be embodied not only in hardware but also in software. For example, when the method is embodied in software, the negative inverse of the modulus M is sequentially calculated according to each bit by applying the method. When the method is embodied in hardware, a required negative inverse of the modulus M is calculated after a system reads at least k lower bits of the modulus M. Generally, the modulus M has a large number of bits compared to a word size, such as 32 bits or 64 bits, used in a related system, i.e. the modulus M has 1,024 bits or 2,048 bits. The bits of the modulus M are not read all at once, but are read through several times. Here, the bits may be read from an LSB. Accordingly, while reading the bits of the modulus M, the negative inverse of the modulus M is calculated in parallel.

The negative inverse of the modulus M may be expressed in a form of $m_i$. Here, negative inverses of multiple bits may be calculated in one cycle. Here, since a carry delivery is included in a process of calculating the negative inverse, it is beneficial to suitably distribute the entire negative inverses according to the maximum operational frequency of a related system.

As described above, k lower bits are sufficient for the negative inverses of the modulus M used in Montgomery multiplication. However, calculating an inverse of a modulus in involutions of 2 is also related to a discrete logarithm which is closely related to realizing an encoding system, and thus it is possible to calculate a negative inverse of at least k lower bits by using the algorithm. It is unrealistic to calculate negative inverses of all bits at once, because a lot of time is consumed in receiving all the bits of the modulus M, operations become complicated, and a significant amount of operational time is required. Accordingly, all the bits of the modulus M are divided into groups in a ratio of a predetermined bits, negative inverses of a group that is already received is calculated, and then negative inverses of other groups are sequentially calculated as the groups are received.

Let's assume that all the bits of the modulus M are divided into L groups ($M_0$~$M_{(L-1)}$), and each group includes k bits. A process of calculating a negative inverse of a first modulus group $M_0$ will now be described.

Such a process will be easily understood when shown in a flowchart.

FIG. 1 is a flowchart illustrating a method 100 of calculating a negative inverse of a modulus M, according to an embodiment of the inventive concept.

The method 100 includes operation 110, operation 120, and operation 130.

In operation 110, a first modulus group $M_0$ of the modulus M and a negative inverse $V_0$ of the first modulus group $M_0$ are set.

The first modulus group $M_0$ assigned with k bits is set as Equation 4 below. The subscript 2, indicated at a lower end of a bracket, denotes a binary number.

$$M_0 = (m_{k-1}, m_{k-2}, \ldots, m_1, 1)_2 \quad (4)$$

The negative inverse $V_0$ of the first modulus group $M_0$ is set as Equation 5 below.

$$V_0 = -\frac{1}{M} \bmod 2^k = (v_{k-1}, v_{k-2}, \ldots, v_1, 1)_2 \quad (5)$$

Since the negative inverse $V_0$ must be an odd number in Montgomery multiplication, the LSB $v_0$ is always 1.

In operation 120, P obtained by converting the first modulus group $M_0$ to a negative number, and S obtained by subtracting 1 from P, are defined.

The P is expressed as Equation 6 below.

$$P = -M_0 = (1-m_{k-1}, 1-m_{k-2}, \ldots, 1-m_1 1)_2 \quad (6)$$

Also, the S is expressed as Equation 7 below.

$$S = P-1 = -M_0 - 1 = (1-m_{k-1}, 1-m_{k-2}, \ldots, 1-m_1 0)_2 = (s_{k-1}, s_{k-2}, \ldots, s_1, s_0)_2 \quad (7)$$

Since the LSB $v_0$ of the negative inverse $V_0$ is determined to be 1 as shown in Equation 2 above, values of a next LSB $v_1$ through the most significant bit (MSB) $v_{k-1}$ are calculated.

In operation 130, values of remaining bits of the negative inverse $V_0$ of the first modulus group $M_0$ are calculated.

First, when a variable j is 1 in operation 131, the second LSB $v_1$ of the negative inverse $V_0$ of the first modulus group $M_0$ is calculated.

In the current embodiment, a result of dividing a binary number by 2 as described above is applied.

Accordingly, after dividing S by 2 in operation 132, the LSB $s_0$ of a value of the divided S is determined as the second LSB $v_1$ of the negative inverse $V_0$ in operation 133. Consequently, the LSB $v_0$ and the second LSB $v_1$ when the variable j is 1 are determined.

In operation 134, the new S is defined as Equation 8 below.

$$S = S + s_0 P \quad (8)$$

After adding 1 to the variable j in operation 135, the variable j and a number of bits (k−1) of the negative inverse $V_0$ are compared in operation 136. When the variable j is below the number of bits, operations 132 through 136 are repeated so as to calculate a third LSB $v_2$ through the MSB $v_{k-1}$ of the negative inverse $V_0$, and when the variable j exceeds the number of bits, the method 100 ends since all bits of the negative inverse $V_0$ are calculated.

To aid understanding, an example of calculating a negative inverse $$\left(-\frac{1}{M_0}\right)$$

of a modulus $M_0$, when the modulus $M_0$ comprises 8 bits ($m_7$, $m_6$, $m_5$, $m_4$, $m_3$, $m_2$, $m_1$, 1), will now be described. In other words, the modulus $M_0$ of 8 bits, which is a first modulus group of a modulus M including bits more than 8 bits, will now be described. In the following description, the modulus $M_0$ comprises 8 bits, but the number of bits of the modulus $M_0$ is not limited thereto.

In Montgomery multiplication, $$V_0 = -\frac{1}{M_0} \bmod 2^k = (v_{k-1}, v_{k-2}, \ldots, v_1, 1)_2$$

must be an odd number, and thus it is well known that $v_0$ is always 1.

Accordingly, the LSB of $V_0$ is $v_0=1$.

Next, values of remaining bits of V are determined.

When an index n of $v_n$ has the lowest number, $v_n$ is the LSB, and when the index n has the highest number, $v_n$ is the MSB.

According to the definition of P, which is a negative ($-M_0$) of the modulus $M_0$, P becomes $(1-m_{k-1}, 1-m_{k-2}, \ldots, 1-m_1, 1)_2$. Also, when S, obtained by subtracting 1 from the negative of the modulus $M_0$ is $(1-m_{k-1}, 1-m_{k-2}, \ldots, 1-m_1, 0)_2$, the LSB is 0.

When j is 1, the LSB ($s_0$) of S is 0, and thus when S is divided by 2, a result is $(1-m_{k-1}, 1-m_{k-2}, \ldots, 1-m_1)_2$.

It has been described above that the number of bits of $S+s_0 P$ is identical to the number of bits of S subtracted by 1.

According to an operational equation $$S = \frac{S}{2},$$

which stores a value (S/2) obtained by dividing S by 2 again as S, $v_1 = s_0 = 1 - m_1$.

As described above, values of $v_0$ and $v_1$ are determined.

Next, an operational equation $S = S + s_0 P$ is calculated.

When j is 2, $s_0 (= 1 - m_1)$ denotes a value of one bit of a binary number, and thus is 0 or 1.

When $s_0 (= 1 - m_1)$ is 0, $s_0 P = 0$, and thus $S (= S + s_0 P) = (1 - m_{k-1}, 1 - m_{k-2}, \ldots, 1 - m_1)_2$, and $$\frac{S}{2} = (1 - m_{k-1}, 1 - m_{k-1}, \ldots, 1 - m_2)_2.$$

Here, $v_2 = 1 - m_2$.

When $s_0 (= 1 - m_1)$ is 1, $s_0 P = P$, and thus $S = S + P = (1 - m_{k-1}, 1 - m_{k-2}, \ldots, 1 - m_1)_2 + (1 - m_{k-1}, 1 - m_{k-2}, \ldots, 1 - m_1, 1)_2$.

Since $(1 - m_1)$ is 1, $s_0 (= 1 - m_1 + 1)$ is 0. Here, according to $1 + 1$, one $(C_1)$ is transferred to $s_1$.

$s_1 = (1 - m_2) + (1 - m_1) = (1 - m_2) + 1 + 1(C_1) = (1 - m_2)$. Here, according to $1 + 1(C_1)$, one carry $C_2$ is transferred to $s_2$.

$$s_2 = (C_2 + 1 - m_2 + 1 - m_3)$$

Here according to a result of calculating S/2, $v_2(s_0) = 1 - m_2$.

As described above, regardless of the value of $s_0 (= 1 - m_1)$, $v_2$ is always $1 - m_2$.

Accordingly when $i = 2$, $v_2 = 1 - m_2$.

Next, an operational equation $S = S + s_0 P$ is calculated.

When the above processes are repeated from $i = 3$ through $i = 7$, $v_3$ through $v_7$ are obtained as follows. Here, a suffix b denotes an inverse of v, and C denotes a value of a carry.

$$C_3 + v_{3b} = m_3 + m_2 + m_1$$

$$C_4 + v_{4b} = m_4 + m_3 + C_3$$

$$C_5 + v_{5b} = m_5 + m_4 + m_3 + m_1 + C_4$$

$$C_6 + v_{6b} = m_6 + m_5 + m_4 + m_2 + m_3 m_2 + m_3 m_1 + m_2 m_1 + C_5$$

$$v_{7b} = m_7 + m_6 + m_5 + m_4 + m_3 m_2 m_1 + (m_4 + m_3 + 1)(m_2 + m_1) + C_6$$

Figure 2:
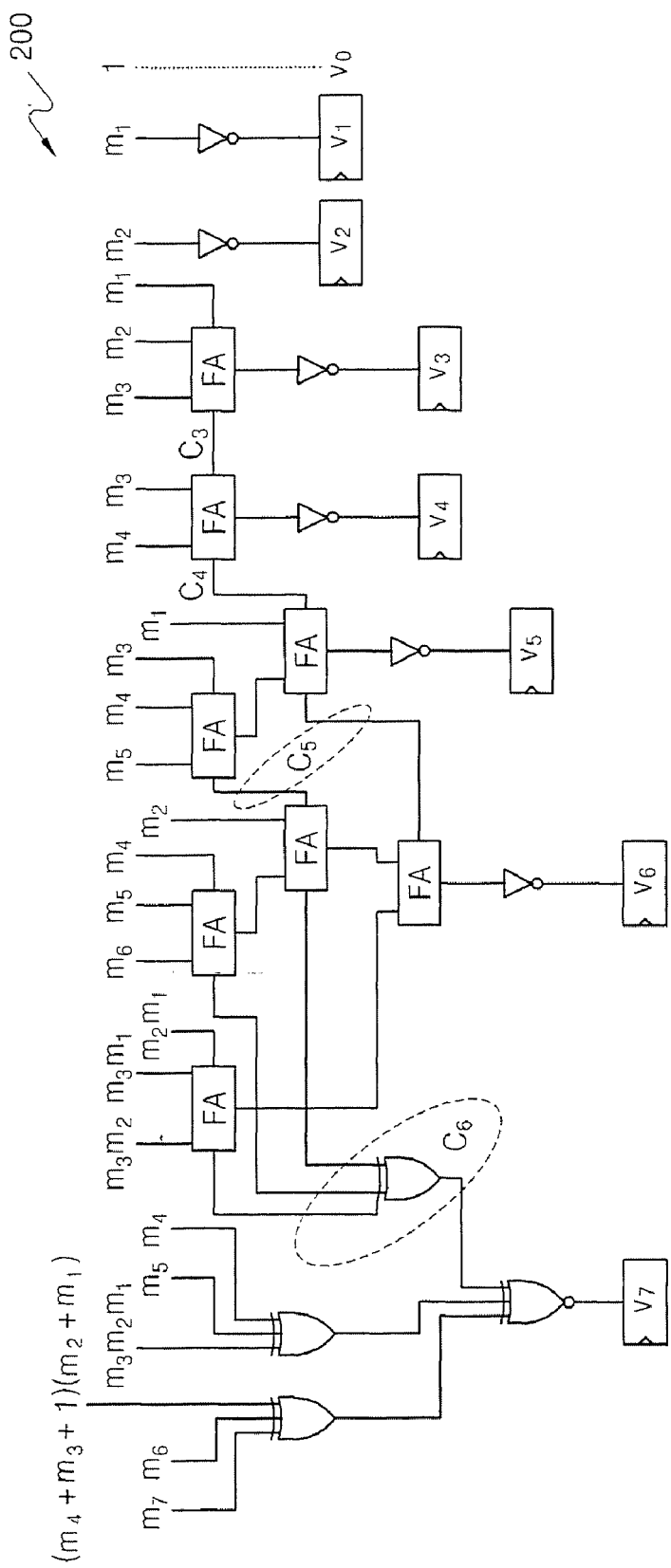
FIG. 2 is a diagram illustrating a negative inverse calculator for calculating a negative inverse of a modulus, according to an embodiment of the present invention.

FIG. 2 is a diagram illustrating a negative inverse calculator 200 for calculating a negative inverse of a modulus, according to an embodiment of the inventive concept.

The negative inverse calculator 200 is hardware performing processes of the method 100 of calculating a negative inverse of a modulus as described above, wherein the modulus comprises 8 bits. The negative inverse calculator 200 may be simply realized by using an inverter, an exclusive OR gate (EX-OR), an exclusive NOR gate (EX-NOR), and a full adder (FA).

Referring to FIG. 2, the LSB ($v_0$) of a negative inverse $V_0$ of a modulus $M_0$ is always 1, a second LSB ($v_1$) is a reciprocal $(1 - m_1)$ of $m_1$, and a third LSB ($v_2$) is a reciprocal $(1 - m_2)$ of $m_2$, and thus $v_1$ and $v_2$ are each calculated by passing $m_1$ and $m_2$ through the inverter. An equation related to a fourth LSB ($v_3$) is $C_3 + V_{3b} = m_3 \pm m_2 + m_1$, and accordingly, the FA generates the fourth LSB by passing a result of adding $m_1$, $m_2$, and $m_3$ through the inverter, and transfers a carry ($C_3$) generated accordingly to a next operational stage.

Input and output relationships of remaining circuits illustrated in FIG. 2 realize the processes of the method 100, and thus the negative inverse calculator 200 is associated with each process.

As described above, the method 100 and the negative inverse calculator 200 sequentially calculate the LSB through MSB of the modulus $M_0$. Here, it is possible to use lower bits as they are in a lower radix. For example, when only 6 lower bits of the 8 bits of the modulus $M_0$ are used, a negative inverse of the modulus $M_0$ in mod $2^6$ is calculated.

In general, when $K_m > K_s$, a negative inverse of a modulus in radix $2^{Ks}$ is always easily calculated from a negative inverse of a modulus in radix $2^{Km}$. When, the modulus $M_0$ is fixed, $$-\frac{1}{M}$$

may be repeatedly used by calculating the modulus $M_0$ only once while performing modular multiplication, and then storing a result of the calculation in a memory such as a register.

Hardware executing Montgomery multiplication generally reads a modulus M before executing Montgomery multiplication. Here, after reading at least k bits of the modulus M, a negative inverse of the modulus M may be calculated by using the already read k bits while simultaneously reading remaining bits. Specifically, when the modulus M is read through several cycles, a process of calculating a negative inverse of the modulus M may be performed in parallel with a process of reading bits of the modulus M.

Figure 3:
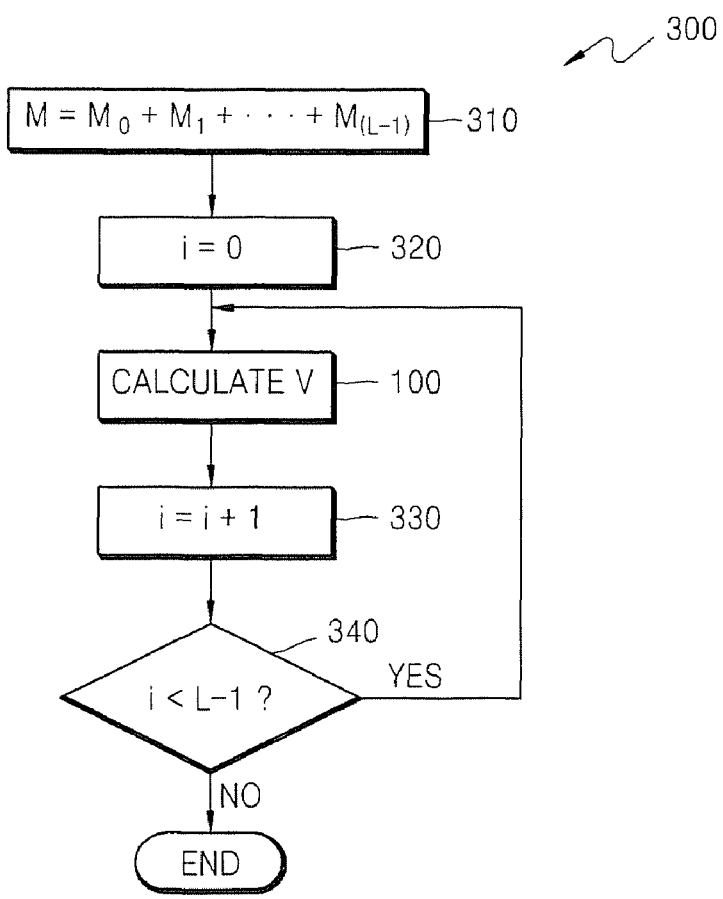
FIG. 3 is a flowchart illustrating a method of calculating a negative inverse of a modulus, according to another embodiment of the present invention.

FIG. 3 is a flowchart illustrating a method 300 of calculating a negative inverse of a modulus, according to another embodiment of the inventive concept.

Referring to FIG. 3, a modulus M may be divided into L modulus groups ($M_0 \sim M_{(L-1)}$). As illustrated in FIGS. 1 and 2, the negative inverse of the first modulus group $M_0$ is obtained by using the method 100, and negative inverses of the remaining modulus groups $M_1 \sim M_{(L-1)}$ may be calculated by using the method 300.

In mobile products, it is required to maintain high security while minimizing overhead required in security. Accordingly, it is important to quickly and efficiently realize a public key encoding system using an operation of a very large number. By using the methods 100 and 300, and the negative inverse calculator 200, a negative inverse of a modulus that is essentially used in high radix Montgomery multiplication is calculated with a small memory and a logic circuit.

The methods 100 and 300, and the negative inverse calculator 200 may not only be applied to an encoding system, but also to a signature or authentication system.

The present invention has been described with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

It should also be noted that in some alternate implementations, the functions/acts noted in the blocks of the block diagrams/flowcharts may occur out of the order noted in the block diagram/flowcharts. For example, two blocks shown in succession may in fact be executed substantially concurrently or the blocks may sometimes be executed in the reverse order, depending upon the functionality/acts involved. Moreover, the functionality of a given block of the flowcharts/block diagrams may be separated into multiple blocks and/or the functionality of two or more blocks of the flowcharts/block diagrams may be at least partially integrated.

It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of calculating a negative inverse of a modulus $M_0$, the method comprising:
   setting a modulus $M_0$;
   defining P obtained by converting the modulus $M_0$ to a negative number, and defining S obtained by subtracting 1 from P; and
   calculating a negative inverse $V_0$ of the modulus $M_0$ by using P and S, wherein the calculating of the negative inverse comprises:
      dividing S by 2;
      assigning a value of a least significant bit (LSB) of S divided by 2 as a value of the LSB that is not determined among the bits forming the negative inverse $V_0$ of the modulus $M_0$; and
      replacing S by a value obtained by adding a value obtained by dividing S by 2 to a value obtained by multiplying P by the value of the LSB of the divided S, wherein the setting, defining, and calculating steps are performed by at least one processor.

2. The method of claim 1, wherein k bits are equally assigned to the modulus $M_0$ and the negative inverse $V_0$ of the modulus $M_0$, wherein k is equal to or below a number of bits assigned to the entire modulus.

3. The method of claim 2, wherein in the calculating of the negative inverse $V_0$, a least significant bit (LSB) of the negative inverse $V_0$ through a most significant bit (MSB) of the negative inverse $V_0$ are sequentially calculated.

4. The method of claim 1, further comprising repeating the dividing, the assigning, and the replacing until the MSB of the negative inverse $V_0$ of the modulus $M_0$ is obtained.

5. The method of claim 1, wherein when $M_0=(m_{k-1}, m_{k-2}, \ldots, m_1, 1)_2$, k is an integer, and $V_0=-1/M_0$ mod $2^k=(v_{k-1}, V_{k-2}, \ldots, v_1 1)_2$, wherein $M_0$ is the modulus, $V_0$ is the negative inverse of the modulus, and k is 8, $$v_0=1$$

$$v_1=1-m_1$$

$$v_2=1-m_2$$

$$C_3+v_{3b}=m_3+m_2+m_1$$

$$C_4+v_{4b}=m_4+m_3+C_3$$

$$C_5+v_{5b}=m_5+m_4+m_3+m_1+C_4$$

$$C_6+v_{6b}=m_6+m_5+m_4+m_2+m_3m_2+m_3m_1+m_2m_1+C_5$$

$$v_{7b}=m_7+m_6+m_5+m_4+m_3m_2m_1+(m_4+m_3+1)(m_2+m_1)+C_6.$$

6. The method of claim 1, further comprising storing the negative inverse $V_0$ of the modulus $M_0$ in a memory device.

7. A method of calculating a negative inverse of a modulus, the method comprising:
   classifying a main modulus into L modulus groups, wherein L is an integer of at least 1; and
   sequentially calculating negative inverses of L modulus groups from a modulus group including an LSB of the main modulus through a modulus group including an MSB of the main modulus, comprising:
      defining P obtained by converting each of the L modulus groups into a negative number, and defining S obtained by subtracting 1 from P; and
      calculating a negative inverse of each of the L modulus groups by using P and S;
   wherein the calculating of the negative inverse comprises:
      dividing S by 2;
      assigning a value of the LSB of S divided by 2 as a value of the LSB that is not determined among the bits forming a negative inverse of each of the L modulus groups; and
      replacing S by a value obtained by adding a value obtained by dividing S by 2 to a value obtained by multiplying P by the value of the LSB of the divided S
   wherein the classifying and sequentially calculating steps are performed by at least one processor.

8. The method of claim 7, wherein in the calculating, the LSB of the negative inverse of each of the L modulus groups through the MSB of the negative inverse of each of the L modulus groups are sequentially calculated.

9. A computer program product for calculating a negative inverse of a modulus $M_0$, comprising a non-transitory computer readable storage medium having encoded thereon instructions that, when executed on a computer, cause the computer to:
  set a modulus $M_0$;
  define P obtained by converting the modulus $M_0$ to a negative number, and defining S obtained by subtracting 1 from P; and
  calculate a negative inverse $V_0$ of the modulus $M_0$ by using P and S, wherein the calculating of the negative inverse comprises:
  dividing S by 2;
  assigning a value of the LSB of S divided by 2 as a value of the LSB that is not determined among the bits forming the negative inverse $V_0$ of the modulus $M_0$; and
  replacing S by a value obtained by adding a value obtained by dividing S by 2 to a value obtained by multiplying P by the value of the LSB of the divided S.

10. An apparatus for generating a negative inverse V of a modulus M, the apparatus comprising:
  a calculator configured to calculate a negative inverse $V_0$ of a modulus $M_0$; and
  a processor configured to read the modulus $M_0$ and input the modulus $M_0$ into the calculator;
  wherein when $M_0 = (m_{k-1}, m_{k-2}, \ldots, m_1, 1)_2$, k is an integer, and $V_0 = -1/M_0 \bmod 2^k = (V_{k-1}, V_{k-2}, \ldots, V_1, 1)_2$,
  wherein $M_0$ is the modulus, $V_0$ is the negative inverse of the modulus, and k is 8, $v_0 = 1$ $v_1 = 1 - m_1$ $v_2 = 1 - m_2$ $C_3 + v_{3b} = m_3 + m_2 + m_1$ $C_4 + v_{4b} = m_4 + m_3 + C_3$ $C_5 + v_{5b} = m_5 + m_4 + m_3 + m_1 + C_4$ $C_6 + v_{6b} = m_6 + m_5 + m_4 + m_2 + m_3 m_2 + m_3 m_1 + m_2 m_1 + C_5$ $v_{7b} = m_7 + m_6 + m_5 + m_4 + m_3 m_2 m_1 + (m_4 + m_3 + 1)(m_2 + m_1) + C_6$.

11. The apparatus of claim 10, wherein the processor classifies the modulus M into L modulus groups and inputs each of the L modulus groups into the calculator sequentially, and wherein L is an integer of at least 1.

12. The apparatus of claim 11, wherein the calculator calculates a negative inverse of one of the L modulus groups while the processor reads another of the L modulus groups simultaneously.

* * * * *